United States Patent [19]
Rutkowski et al.

[11] 3,727,464
[45] Apr. 17, 1973

[54] LIQUID SAMPLING

[75] Inventors: Michael D. Rutkowski, Phoenixville; Robert K. Stanley, Media, both of Pa.

[73] Assignee: Pro-Tech, Inc., Malvern, Pa.

[22] Filed: Apr. 14, 1972

[21] Appl. No.: 244,105

[52] U.S. Cl. .................................. 73/421 B, 417/138
[51] Int. Cl. ................................................ G01n 1/14
[58] Field of Search ..................... 73/421 B; 417/143, 417/145, 146, 147, 144, 138, 141

[56] References Cited

UNITED STATES PATENTS

| | | | |
|---|---|---|---|
| 3,120,128 | 2/1964 | Snyder | 73/421 B |
| 2,658,389 | 11/1953 | Eby | 73/302 |
| 2,026,226 | 12/1935 | Entrop | 417/143 |
| 2,412,723 | 12/1946 | Elliott | 417/138 |

*Primary Examiner*—S. Clement Swisher
*Attorney*—Charles A. McClure et al.

[57] ABSTRACT

Repetitive sampling of liquid from a body thereof is controlled in frequency, dependent upon the depth of the liquid being sampled, so as to accord with the volume of the body thereof. Such depth-proportioning is accomplished, in a system using pressurized gas as a propulsion fluid and determining sampling frequency by gradual release thereof from a source to accumulate to a switching pressure at a given location, through bleeding off part of the accumulating gas against the back pressure of the depth of liquid. Principal uses are in stream monitoring for pollution control, in sewage treatment facilities, and in industrial waste reduction programs.

17 Claims, 4 Drawing Figures

PATENTED APR 17 1973  3,727,464

LIQUID SAMPLING

This invention relates to sampling a liquid medium, such as for determination of the composition thereof or of contaminants therein, concerning especially repetitive sampling accomplished by use of a pressurized fluid for sample propulsion.

Manual techniques for sampling a body of liquid are giving way to automatic sampling procedures, usually electrically operated. Where electricity is unavailable, inconvenient, or hazardous, it has become customary to use compressed gas not only as a propulsion fluid but also to control the sampling repetition frequency. Whenever the volume of liquid at, or flowing past, a given sampling locus is variable, it is desirable, in the interest of a more representative result, to vary the sampling frequency or sample volume (or both) in accordance therewith. The net effect is to proportion the volume of liquid obtained in the form of samples to the total volume of liquid in the body from the beginning to the end of the overall time period within which samples were taken. Conventional practice relies upon impulses provided from separate measuring devices, usually electrical, to trigger the sampling.

A primary object of the present invention is depth-proportional liquid sampling without electrical actuation.

Another object is provision of pressure-actuated depth-proportional means for sampling liquids.

A further object is adaptation of a depth-proportional sampling accessory to a variety of gas-actuated liquid-sampling equipment.

Other objects of the present invention, together with means and methods for attaining the various objects, will be apparent from the following description and the accompanying diagrams.

In general, the objects of the present invention are accomplished, in sampling of liquid from a body thereof at a given locus therein to a collection location wherein accumulation of fluid is utilized to determine sampling frequency, by bleeding off fluid from such accumulation against back pressure of the body of liquid at the sampling locus therein and thereby relating the quantity of liquid collected to the depth at the sampling locus.

The invention contemplates, in apparatus for sampling liquid, a source of fluid at superatmospheric pressure, valve means regulating flow of fluid from the source to a locus of accumulation thereof, means interconnecting the locus of fluid accumulation to the liquid to be sampled to bleed fluid off against back pressure of the liquid, and means separately interconnected to such locus and responsive to the pressure of such fluid accumulation for effecting sampling of the liquid whenever a certain pressure thereof is reached.

Figure 1:
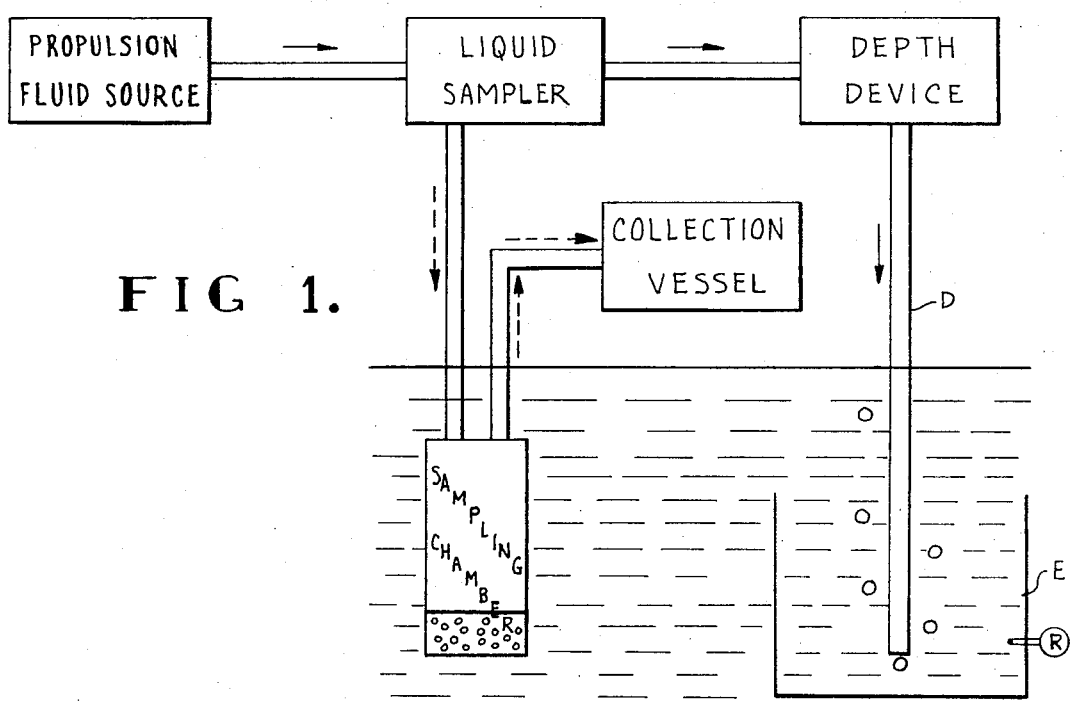
FIG. 1 is a schematic, largely block, diagram of apparatus useful according to this invention.

FIG. 1 shows in block form, with double-line or tubular interconnections, a Propulsion Fluid Source providing fluid continuously (solid arrow) to a Liquid Sampler from which fluid is supplied intermittently (broken arrow) to a Sampling Chamber having provision for liqiud intake (openings) under the surface of a body of liquid (shaded). Some of the fluid flows continuously from the Liquid Sampler to a Depth Device and then bubbles continually out from the open bottom end of depth tube D extending downward to the level of the Sampling Chamber intake. Samples of liquid collected therein are propelled from time to time into a Collection Vessel by the discontinuous flow of propulsion fluid. The end of the bubbler tube is shown inside partial enclosure E (shown schematically) to protect it from effects of liquid flow such as might adversely affect the static back pressure. The pressure at such depth may be read on meter or indicator R (suitably located to be readily visible, here shown just outside enclosure E) to facilitate calibration or may be calculated from knowledge of the depth.

As subsequently indicated, the Depth Device comprises valving appropriate to the task. Shown in each of the subsequent views, the preferred valving includes valve $V_{10}$, which is simply an on-off control that in the latter position incapacitates the device; valve $V_{11}$, which is a pressure-regulator capable of providing constant fluid pressure downstream therefrom; valve $V_{12}$, which is an adjustable flow-regulator; and valve $V_{13}$, which is a two-position three-way valve, normally open to the end of the bubbler tube but with an alternative closed position, in which the part of the bubbler tube upstream is vented to the atmosphere, as is useful during calibration.

Figure 2:
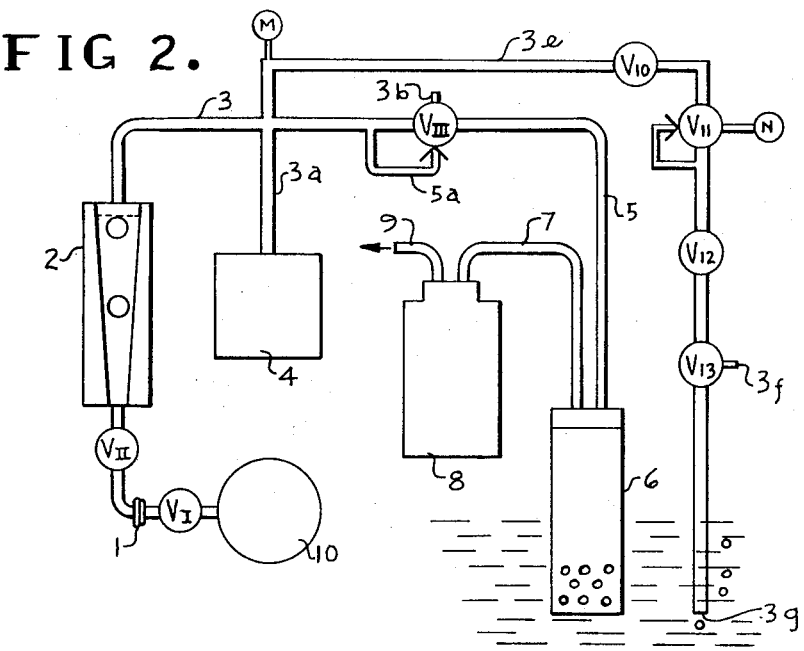
FIG. 2 is a schematic diagram of the practice of the invention in conjunction with a first embodiment of liquid-sampling apparatus.

FIG. 2 illustrates use of such a depth device and bubbler tube in conjunction with an embodiment of liquid-sampling apparatus such as is disclosed in Blechman U.S. Patent application Ser. No. 139,759 filed 3 May 1971, whose disclosure is incorporated by reference herein, especially to the extent not set forth below. Source 10 of fluid under pressure delivers fluid through on-off valve $V_I$, coupling 1, flow-regulating valve $V_{II}$, and flowmeter 2 into conduit 3. Conduit 3 joins conduit $3a$, which leads to ballast or surge tank 4; conduit 5, which leads through pressure-responsive switching (snap action) valve $V_{III}$ to sampling chamber 6; and conduit $3e$ containing the valves of the depth device, terminating in the bubbler tube with outlet end $3g$. The fluid pressure at the conjunction of those conduits appears on meter or indicator M. Valve $V_{III}$ is normally closed until whenever the pressure in sensing tube $5a$ from fluid accumulating upstream thereof attains a preset actuating pressure, whereupon the valve opens and interconnects surge tank 4 to sampling chamber 6.

Resulting fluid pressure in the sampling chamber closes a check valve therein (not shown) between the chamber and the surrounding liquid and forces the sample of liquid therein through conduit 7 into collection vessel 8. Excess propulsion fluid is vented from the collection vessel to the atmosphere through vent tube 9. When the pressure immediately upstream of valve $V_{III}$ falls sufficiently the valve recloses, venting the sampling chamber to the atmosphere through vent $3b$ of valve $V_{III}$, whereupon the next sample of liquid enters the sampling chamber through the check valve therein.

Operation of the depth proportional feature is as readily understood. With valves $V_{10}$ and $V_{13}$ open to the end of the bubbler tube, the rate of accumulation of fluid in the surge tank is reduced by bleeding off of part of the fluid, which otherwise would accumulate there, through the various valves and the bubbler tube and out the outlet 3g. Valve $V_{11}$ regulates the pressure in the bubbler tube downstream to a substantially constant value, shown on meter or indicator N, thereby essentially eliminating variation in flow rate with change in accumulated pressure (and in source pressure generally, in the absence of a constant-pressure source). Valve $V_{12}$ is preadjusted to a desired flow rate in the tube, usually in a calibration step performed as described below.

It is readily understood that, the shallower the liquid above the end of the bubbler tube, the lower is the back pressure that is applied to the fluid in the tube. Of course, with lower back pressure the rate at which fluid bubbles from the open end of the tube is greater than with high back pressure (corresponding to deeper liquid above the tube end). The greater the rate at which fluid bubbles from the tube, the longer it takes for fluid to accumulate upstream of valve $V_{III}$ to the pressure level at which the valve opens, thereby reducing the sampling repetition frequency in accordance with the lesser volume of liquid being sampled. Conversely, when the volume of liquid is great, the resulting lower bleed-off rate of fluid permits more rapid accumulation and, thus, more frequent valve actuation and consequently more total sample collected in a given time period.

In order to calibrate the system, the operator should close valve $V_{10}$ to inactivate the depth device and then adjust the fluid flow-regulating valve ($V_{II}$ in FIG. 2, $V_2$ in subsequent embodiments) for the fastest sampling frequency desired at maximum depth of liquid to be sampled. Next, with valve $V_{10}$ reopened, pressure-regulating valve $V_{11}$ should be adjusted so that its downstream pressure, as read on meter or indicator N, conforms to the pressure at the depth of liquid to be sampled (optionally visible on meter or indicator R, if used as in FIG. 1). Then valve $V_{13}$ is switched to close off the end of the bubbler tube and vent fluid from upstream to the atmosphere through vent 3f of that valve. Thereupon, flow-regulating valve $V_{12}$ is adjusted so that the rate of fluid vented equals the rate at which fluid is supplied from the source to the accumulation region, i.e., no net gain or loss of fluid from that region as indicated on meter M. This "zeroes" the system, and with valve $V_{13}$ switched back to the operating position the fluid loss through the bubbler tube should vary in accordance with the liquid depth.

As is desirable, the effect of such loss should vary the sampling repetition frequency in proportion to the volume of liquid. In still liquid or at constant rate of liquid flow past the end of the bubbler tube, the liquid volume varies directly with the depth, in which event the sampling repetition frequency should vary likewise. Over small increments or decrements in accumulated fluid pressure, as occasioned by opening and closing of valve $V_{III}$ (FIG. 2) such condition should be assured, and it prevails in subsequently illustrated embodiments despite greater structural complexity. Where non-linear variations in liquid volume with depth or time (or both) occur, a corrective factor should be superimposed on the rate of accumulation of fluid that otherwise determines sampling repetition rate independently of such non-linearity.

Usually the medium sampled is aqueous, whether from natural streams, water supplies, sewage systems, or industrial effluents. However, it may be non-aqueous, such as oil, gasoline, or other organic liquid. The propellant fluid should be selected as suitably inert to the liquid being sampled; some such gases may be supplied in liquefied form in a source vessel. Examples of propellant fluid include nitrogen, carbon dioxide, halogenated hydrocarbon, or even compressed air (if oxygenation of the sample is not important). Suitable fluids are sold, chiefly for refrigerant use, under such brand names as "Freon" (a duPont trademark) and "Isotron" (a Pennwalt trademark).

The dimensions of the apparatus are dependent upon the nature of the sampled medium, including the concentration, nature, and size of any solids therein. The materials of construction should be suitably inert, of course, with regard to the medium to be sampled. Ordinarily the sampling apparatus can be made portable to permit its ready transportation to and from almost any sampling site. The components not illustrated in detail, such as valves, sampling chamber, collection vessel, and the source of pressurized fluid itself are conventional, and suitable examples thereof are well known to persons ordinarily skilled in the arts to which this invention pertains.

Figure 3:
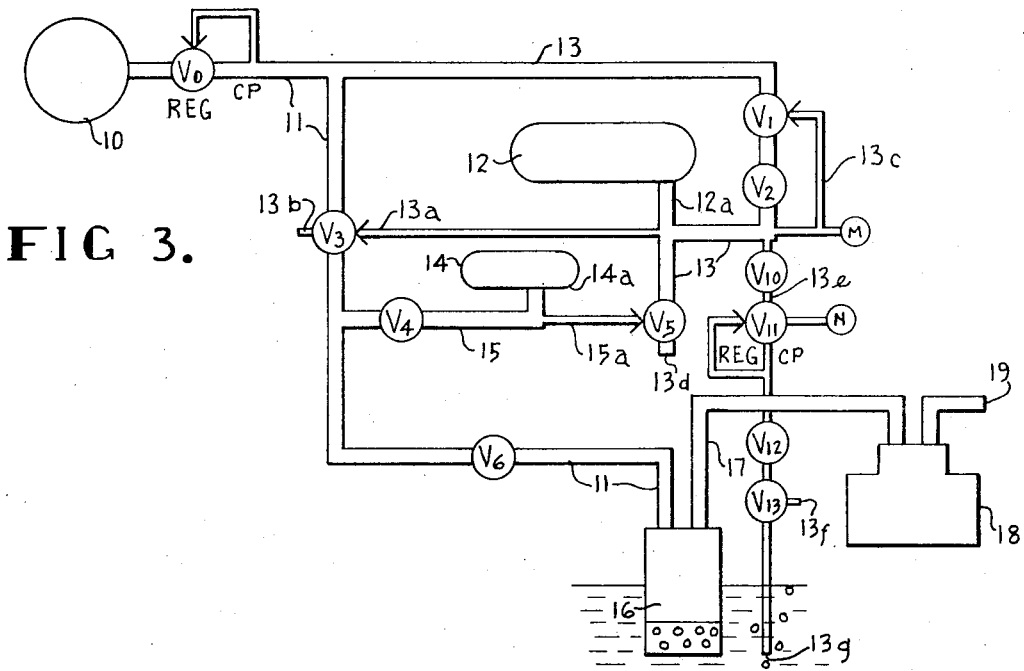
FIG. 3 is a schematic diagram of the practice of the invention in conjunction with a second embodiment of liquid sampler.

The embodiment drawn schematically in FIG. 3 operates similarly to the apparatus already illustrated and described but insofar as the sampling is concerned is structured somewhat differently. The liquid-sampling apparatus shown therein, except for conjunction of the depth device and bubbler tube of this invention, is substantially as disclosed in Rutkowski and Thompson U.S. Patent application Ser. No. 237,400 filed 23 Mar. 1972, whose disclosure is incorporated by reference herein, especially to the extent not set forth below.

FIG. 3 shows schematically source 10 of propulsion fluid under pressure and main conduit 11 leading therefrom past various branches and valves to sampling chamber 16, which is immersed in a body of liquid to be sampled. Valves in the main conduit include first normally open pressure-regulating valve $V_0$, which ensures a first level of constant pressure immediately downstream therefrom; first normally closed pressure-responsive switching valve $V_3$, which is adapted to open at a given pressure; and throttling valve $V_6$, which (when valve $V_3$ is open) somewhat reduces the pressure immediately downstream therefrom, where the sampling chamber is located.

Ancillary branch conduit 13 leads from junction with main conduit 11 at a location between valves $V_0$ and $V_3$. Second constant-pressure regulator valve $V_1$ and adjustable first flow-regulating valve $V_2$, which is normally at least partially open, are located in series in the initial part of the ancillary conduit. Sensing line 13c of valve $V_1$ leads thereto from a junction with conduit 13 downstream of valve $V_2$, thus effectively paralleling the latter valve, and meter or indicator M is connected thereto to read the controlled pressure. The ancillary conduit itself has branch line 12a to primary surge tank 12, and pressure line 13a (shown with arrowhead) to the pressure-sensitive part of valve $V_3$. Bubbler tube conduit 13e (corresponding to 3e of FIG. 1) also branches from ancillary conduit 13 there, contains valves $V_{10}$, $V_{11}$, $V_{12}$, $V_{13}$ (with vent 13f instead of 3f) and indicator N, as before, and terminates in bubbler tube outlet 13g (instead of 3g). Downstream from that branching, ancillary conduit 13 contains second normally closed pressure-responsive switching valve $V_5$, which in its open position dumps the primary surge tank to the atmosphere via outlet 13d downstream.

Auxiliary conduit 15 (not to be confused with the ancillary conduit) leaves main conduit 11 at a location downstream from valve $V_3$ and upstream from valve $V_6$. It goes to the pressure-sensitive part of valve $V_5$ through adjustable second flow-regulating valve $V_4$, which is normally at least partly open. Branch line 14a leads from the auxiliary conduit to secondary surge tank 14, and branch line 15a (with arrowhead) extends from the same junction to the sensing part of valve $V_5$. Sample conduit 17 leads from the sampling chamber to collection vessel 18, which has vent 19 to the atmosphere. Also vented to the atmosphere in the normally closed position of pressure-responsive switching valve $V_3$ via its vent 13b is sampling chamber 16 connected thereto by the intervening portion of main conduit 11.

Operation of this second embodiment of liquid-sampling invention, as embodied in the illustrated apparatus, is readily understood. Fluid from source 10 at elevated pressure flows through valve $V_0$, and enters the main and ancillary conduits at a first given level of pressure determined by the valve. The fluid cannot pass through normally closed valve $V_3$ but flows, at a pressure determined by valve $V_1$ and at a rate determined by the setting of $V_2$, into primary surge tank 12, where it accumulates at gradually increasing pressure, dependent upon the rate of bleed-off into conduit 13e of the depth device. Such pressure is transmitted also to the pressure-sensitive actuating (i.e., switching) part of valve $V_3$. The fluid cannot pass through normally closed valve $V_5$ downstream in the ancillary conduit.

When the pressure in the ancillary conduit and surge tank reaches the switching pressure of valve $V_3$ that valve opens, connecting the fluid source to the sampling chamber through valve $V_6$, which reduces the pressure somewhat. Fluid at the latter pressure flows into the sampling chamber, closing the check valve therein (not shown) and forcing the contents through the sample conduit toward and into the collection vessel. In the meantime, after opening of valve $V_3$, fluid from the source has begun to flow through valve $V_4$, at a rate determined by its setting and downstream back pressure, and into secondary surge tank 14 and contact with the pressure-sensitive actuating or switching part of valve $V_5$. When the switching pressure of the latter valve is reached, after a delay period determined by the setting of valve $V_4$ and resulting pressurization of secondary surge tank 14, valve $V_5$ opens and thereby dumps primary surge tank 12 to the atmosphere. When the pressure in the ancillary conduit falls sufficiently, as the primary surge tank loses pressure, valve $V_3$ will switch back to its closed position, after which the secondary surge tank will lose pressure upon occurrence of reverse flow through valve $V_4$ and through vent 13b of valve $V_3$ (or downstream through valve $V_6$). Thereupon valve $V_5$ will close, liquid will reenter the sampling chamber through the check valve and displace propellant fluid through that vent, and the cycle will recommence.

It is apparent, therefore, that in the apparatus of FIG. 3 the sampling duration or flow of propellant fluid into and through the sampling chamber, is controlled principally by the setting of valve $V_4$. Similarly, the sampling frequency or repetition rate is controlled chiefly by the setting of valve $V_2$ except for action of the depth device. Of course, variation in the sampling duration varies the sampling frequency (with valve $V_2$ at a fixed setting) but is normally relatively limited. The sampling repetition rate usually is within the range of from about a half minute to several hours, while the sampling duration usually ranges between several seconds and about ten seconds or so. The duration, together with the pressure settings and surge tank sizes and related factors (e.g., conduit size and length) determine the height to which the sample may be lifted, which usually ranges from a few feet upwards of about a hundred feet. In the event of variation in depth of the liquid being sampled the rate at which fluid accumulates at the primary surge tank varies and thereby varies the sampling repetition rate essentially as described in connection with the previous embodiment, notwithstanding the differences in structure and operation illustrated and described hereinabove.

Figure 4:
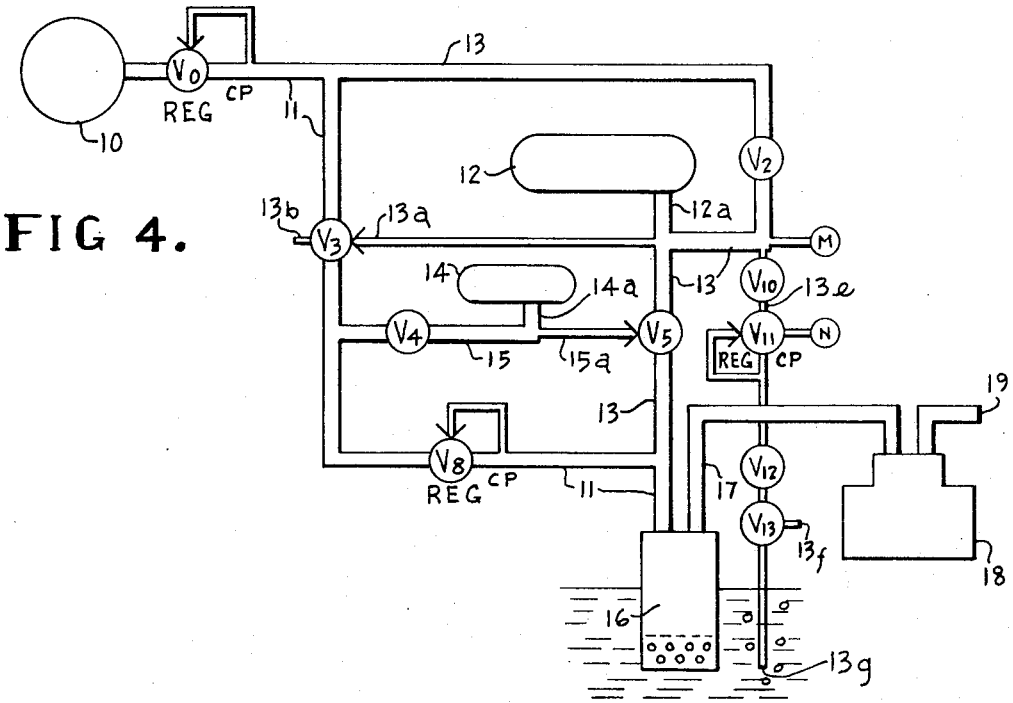
FIG. 4 is a schematic diagram of the practice of the invention in conjunction with a third embodiment of similar apparatus.

The embodiment shown schematically in FIG. 4 is similar to that of FIG. 3 but with certain differences noted below. As some of the parts of these two embodiments are alike (and similarly numbered) and are connected in the same manner, this description focuses upon the differences rather than the likenesses. Constant-pressure valve $V_1$ of FIG. 3 is omitted, and throttling valve $V_6$ is replaced by constant-pressure valve $V_8$. Conduit $V_{13}$ downstream of valve $V_5$ interconnects to main conduit 11 upstream from the inlet to sampling chamber 16, instead of terminating in outlet 13d to the atmosphere. This embodiment, except for modification by the depth device of the present invention, is substantially as disclosed in Rutkowski and Thompson U.S. Patent application Ser. No. 214,822 filed 4 Jan. 1972, whose disclosure is incorporated by reference herein, especially to the extent not set forth below.

Operation of the FIG. 4 embodiment is like that of FIG. 3 until valve $V_3$ opens. Then, after a delay period determined by the setting of valve $V_4$ and resulting pressurization of secondary surge tank 14, valve $V_5$ opens and thereby connects primary surge tank 12 to the sampling chamber. If the sample (i.e., the former contents of the sampling chamber) is already in the collection vessel this extra flow will purge the sampling chamber, sample conduit, and collection vessel and will exhaust to the atmosphere through vent 19; if the sample has not yet reached the collection vessel it will be boosted thereinto by this surge of fluid, with like resulting purging action. Thereafter the action again duplicates that of the FIG. 3 embodiment already described, modified as just described.

The depth device of this invention operates essentially the same in conjunction with the sampling apparatus of FIG. 4 as it does with that of FIG. 3, and that is substantially as it does in conjunction with that of FIG. 2, as shown and described. Similar operation is readily attainable in other apparatus in which sampling repetition frequency is controlled by accumulation of fluid whether also used for sample propulsion or not. It will be apparent that control of duration of sampling, instead of repetition frequency, can be accomplished by disjoining conduit 13e (in the arrangement of FIG. 3 or FIG. 4) from ancillary conduit 13 and joining it to auxiliary conduit 15 near secondary surge tank 14. The secondary surge tank itself may be omitted in any case when the volume of conduit 15 and connected lines is substantial.

Effective sampling is a prerequisite to analysis and/or treatment of the medium in question, such as for pollution control. Good regulation of sampling frequency is required in the formation of composite samples. The apparatus of this invention permits a wide range of sampling frequency with accurate and ready regulation thereof. The depth-proportional feature permits great improvement in the representative character of such samples, especially in periods of fluctuating depth of the liquid being sampled, such as a natural stream during temporary flooding.

Whereas a particular apparatus embodiment of depth device has been described, together with several particular embodiments of pressurized fluid-operated samplers, it will be understood that variations may be made therein, as in the interest of manufacturing economy. Thus, where other calibration methods are available, one or more of the valves utilized in the described preferred method may be omitted. Also, provision of constant-pressure sources of pressurized fluid can replace constant-pressure regulation at sampler input and even permit similar elimination of such regulation at the input to the depth device, at least where switching pressure on/off differential lies within sufficiently close limits. Other modifications also may be made in the depth device and in arrangements of sampling apparatus in conjunction with which it is used, as by addition, combination, or division of parts or steps, or by substitution of equivalents therefor, while retaining at least some of the advantages and benefits of the invention, which itself is defined in the following claims.

The claimed invention is:

1. In sampling of liquid from a body thereof at a given locus therein to a collection location, utilizing accumulation of fluid to determine sampling frequency, the improvement comprising bleeding off fluid from such accumulation against back pressure of the body of liquid at the sampling locus therein and thereby relating the quantity of liquid collected to the depth at the sampling locus.

2. Liquid sampling according to claim 1, including proportioning the quantity of liquid collected by repeated sampling to the liquid depth at the sampling locus.

3. Liquid sampling according to claim 1, wherein the body of liquid is flowing, and including proportioning the quantity of liquid collected by repeated sampling to the liquid flow past the sampling locus.

4. Process of depth-proportional sampling of liquid from a body thereof at a given locus therein by accumulation of fluid for propulsion thereof to a collection location, characterized by the steps of propelling samples of the liquid with the fluid at intervals and bleeding off fluid from such accumulation against back pressure of the body of liquid at the depth of the sampling locus therein.

5. Liquid sampling according to claim 4, including the step of triggering sample propulsion at a certain pressure of accumulated fluid and thereby controlling the sampling repetition frequency.

6. Liquid sampling according to claim 4, wherein the fluid is bled off substantially continuously and is bubbled through the liquid at such depth, including the step of adjusting the bleed-off rate at zero depth of liquid to equal the rate of fluid accumulation.

7. Flow-proportional sampling of liquid to a collection location from a body thereof flowing past a given locus therein, comprising accumulating fluid at increasing pressure from a source thereof, bleeding off fluid substantially continuously from the accumulation thereof at a rate lower than the rate of accumulation, conducting such bled-off fluid to and releasing it against the liquid back pressure at the sampling locus, and thereby regulating the quantity of liquid so propelled and collected in accordance with the flow of liquid past the sampling locus.

8. Liquid sampling according to claim 7, including the step of triggering sample propulsion repeatedly whenever the accumulated fluid pressure reaches a certain value.

9. Liquid sampling according to claim 7, including the step of proportioning the sampling repetition frequency to the liquid flow past the sampling locus.

10. Process of liquid sampling comprising supplying fluid at given pressure continuously from a source thereof, accumulating such fluid at a given location at a regulated rate and at pressure gradually increasing toward the given supply pressure, continuously bleeding off part of the accumulating fluid against back pressure of the liquid to be sampled as determined by the depth thereof at a sampling locus therein, the bleed-off rate at zero depth of liquid equalling the rate of fluid accumulation, establishing, whenever a certain accumulated fluid pressure is reached, an interconnection from the fluid source to the sampling locus and thereby propelling samples of liquids therefrom.

11. Apparatus for sampling liquid, comprising a source of fluid at superatmospheric pressure, valve means regulating flow of fluid from the source to a locus of accumulation thereof, means interconnecting the locus of fluid accumulation to the liquid to be sampled to bleed fluid off against back pressure of the liquid, and means separately interconnected to such locus and responsive to the pressure of such fluid accumulation for effecting sampling of the liquid whenever a certain pressure thereof is reached.

12. Liquid-sampling apparatus according to claim 11, wherein the bleed-off means includes adjustable valve means and a bubbler tube immersed in the liquid to the sampling depth.

13. Liquid-sampling apparatus according to claim 11, including a surge tank at the locus of fluid accumulation, wherein the last means is adapted to interconnect the surge tank intermittently to the liquid to be sampled whenever the certain pressure is reached.

14. Liquid-sampling apparatus according to claim 11, wherein the last named means is adapted to interconnect the fluid source intermittently to the liquid to be sampled whenever the certain pressure is reached.

15. Apparatus for sampling liquid repeatedly from a body thereof, comprising a source of fluid at superatmospheric pressure, first valve means therebetween for determining the sampling repetition rate, including a first normally closed pressure-responsive switching valve; second valve means for determining the duration of individual samplings, including a second normally closed pressure-responsive switching valve therebetween; conduit means containing the respective valve means between the fluid source and the body of liquid and leading therefrom to a collection location for liquid samples, and including means for accumulating fluid under pressure from the source, also including conduit means separately interconnecting the accumulation locus to the body of liquid for bleeding off fluid therefrom against the back-pressure applied thereto by the liquid.

16. Liquid-sampling apparatus according to claim 15, including, in the line of the latter conduit means, valve means for calibrating the bleed-off rate, including means for adjusting such rate at zero back-pressure to equal the rate of flow from the fluid source to the accumulation locus.

17. Liquid-sampling apparatus according to claim 16, wherein the valves therein include in the line of fluid flow a constant-pressure regulator, an adjustable-orifice valve, and a valve having an open position in which the accumulation locus is connected to the body of liquid and having also a closed position in which the fluid is precluded from bleeding off from the accumulation locus and a vent is established to the body of liquid and having also an open position in which propulsion fluid from the accumulation locus is connected to the body of liquid to bubble therethrough.

* * * * *